US008442764B2

(12) United States Patent
Schulze et al.

(10) Patent No.: US 8,442,764 B2
(45) Date of Patent: May 14, 2013

(54) 3-D MAP DISPLAY

(75) Inventors: Jack Schulze, London (GB); Matthew William Webb, London (GB)

(73) Assignee: Schulze & Webb Ltd., London (GB)

( * ) Notice: Subject to any disclaimer, the term of this patent is extended or adjusted under 35 U.S.C. 154(b) by 337 days.

(21) Appl. No.: 12/455,247

(22) Filed: May 29, 2009

(65) Prior Publication Data

US 2010/0305853 A1    Dec. 2, 2010

(51) Int. Cl.
    *G01C 21/00*      (2006.01)
(52) U.S. Cl.
    USPC ............ 701/455; 701/400; 701/436; 701/438
(58) Field of Classification Search ................... None
    See application file for complete search history.

(56) References Cited

U.S. PATENT DOCUMENTS

| | | | | |
|---|---|---|---|---|
| 7,385,615 B2* | 6/2008 | Vale et al. | ...................... | 345/660 |
| 7,420,558 B2* | 9/2008 | Urano et al. | .................. | 345/427 |
| 7,630,833 B2* | 12/2009 | Fukumoto et al. | ............ | 701/436 |
| 2004/0193369 A1* | 9/2004 | Kokojima et al. | ............ | 701/209 |
| 2004/0204832 A1* | 10/2004 | Han | .............................. | 701/208 |
| 2008/0198158 A1* | 8/2008 | Iwamura et al. | .............. | 345/419 |

\* cited by examiner

*Primary Examiner* — Faris Almatrahi
(74) *Attorney, Agent, or Firm* — Harrington & Smith

(57) ABSTRACT

A computer generated 3-dimensional map display includes a reference icon identifying an observation point in the geographic area defined by the map, the map being presented on a curved surface which extends from a first plane to a second plane which is substantially orthogonal to the first plane. The observation point is located in the first plane. The display is configured such that the height of landmarks and buildings in a defined foreground of the reference icon are presented normal to the first plane, the height of land marks and buildings at a defined far distance are presented normal to the second plane and the height of land marks and buildings in a defined middle ground are presented normal to the non-linear portion of the curved surface. The geographic area represented can be translated along the curved surface to provide a perception that the reference icon is roaming through the displayed geographic area.

7 Claims, 4 Drawing Sheets

3-D MAP DISPLAY

FIELD OF THE INVENTION

The present invention relates to the provision of a 3-dimensional map display and in particular to the integration of such a display within a satellite navigation system.

BACKGROUND

Satellite navigation systems with 3 dimensional map displays are known. Typically the displays represent buildings and landmarks in an observed geographic area as blocks or other icons upstanding on an apparently flat ground surface. The blocks or icons are typically identified by text naming the building or landmark. A user's position is represented on the ground surface and the user can position himself within his real surroundings by comparing the proximity of his virtual self to an identified building or land mark on the satellite navigation display with his real position and orientation in regard to the identified building or land mark in the real world.

Such prior art arrangements are helpful in assisting a user identify their current position but do not assist the user in orienting themselves within a wider geographic area.

SUMMARY OF THE INVENTION

The present invention provides a 3-D mapping system that serves both to locate a user in a specific position of a defined geographic area and assist them in locating the position of more distant buildings and landmarks not visible from the located user position in the real world.

In accordance with the present invention there is provided a computer generated 3-dimensional map display including a reference icon identifying an observation point in the geographic area defined by the map, the map being presented on a curved surface which extends from a first plane to a second plane which is substantially orthogonal to the first plane, the observation point being located in the first plane; the display configured such that the height of landmarks and buildings in a defined foreground of the reference icon are presented normal to the first plane, the height of land marks and buildings at a defined far distance are presented normal to the second plane and the height of land marks and buildings in a defined middle ground are presented normal to the non-linear portion of the curved surface and wherein the geographic area represented can be translated along the curved surface to provide a perception that the reference icon is roaming through the displayed geographic area.

Typically the first plane is a horizontal plane and the second plane is a vertical plane.

The novel display permits an observer represented by the reference icon both to identify his position in an immediate locality and orient himself within the mapped area. Since distant buildings and land marks are more visible on the curved surface, the user is more easily able to identify these from his current location and take an informed decision as to what route to take to arrive at an identified distant location. The display is also beneficial in that it enables a greater geographical area to be represented on a smaller display than would be needed to represent the same space on the same scale in a single plane.

The display of the invention has particular application in satellite navigation systems. The model can be integrated with a GPS navigation system such that the reference icon becomes the GPS located position. As the GPS position is changed, the map display is changed relative to the reference icon giving the appearance that the reference icon is moving along the displayed map.

It will be appreciated that a displayed geographic area can not only be translated but also rotated with the reference icon as the centre of rotation, thus producing an impression that the observer has turned to face a different direction in the geographic area.

The curvature of the surface can be selected to suit the desired application. With particular regard to a satellite navigation system, the preferred curvature of the display may depend on the speed at which the observer travels. If the observer is walking, for example, a steeper, faster bend with greater visibility of the most local landmarks and buildings is desirable than for an observer travelling in a motor vehicle where the location of middle distance locations is desirably more visible. For example in flying applications where speed of travel is further increased, a flatter, slower bend showing more distant landmarks and buildings more clearly might be preferred.

An algorithm for translating the map image might be dependant on speed of motion of the travelling GPS defined position. Such an algorithm, as well as translating the position of the map relative to the reference icon, could also adjust the curvature of the map to best suit the speed of travel.

BRIEF DESCRIPTION OF THE DRAWINGS

An embodiment of the invention is now described in more detail with reference to the accompanying figures.

DETAILED DESCRIPTION

Figure 1:
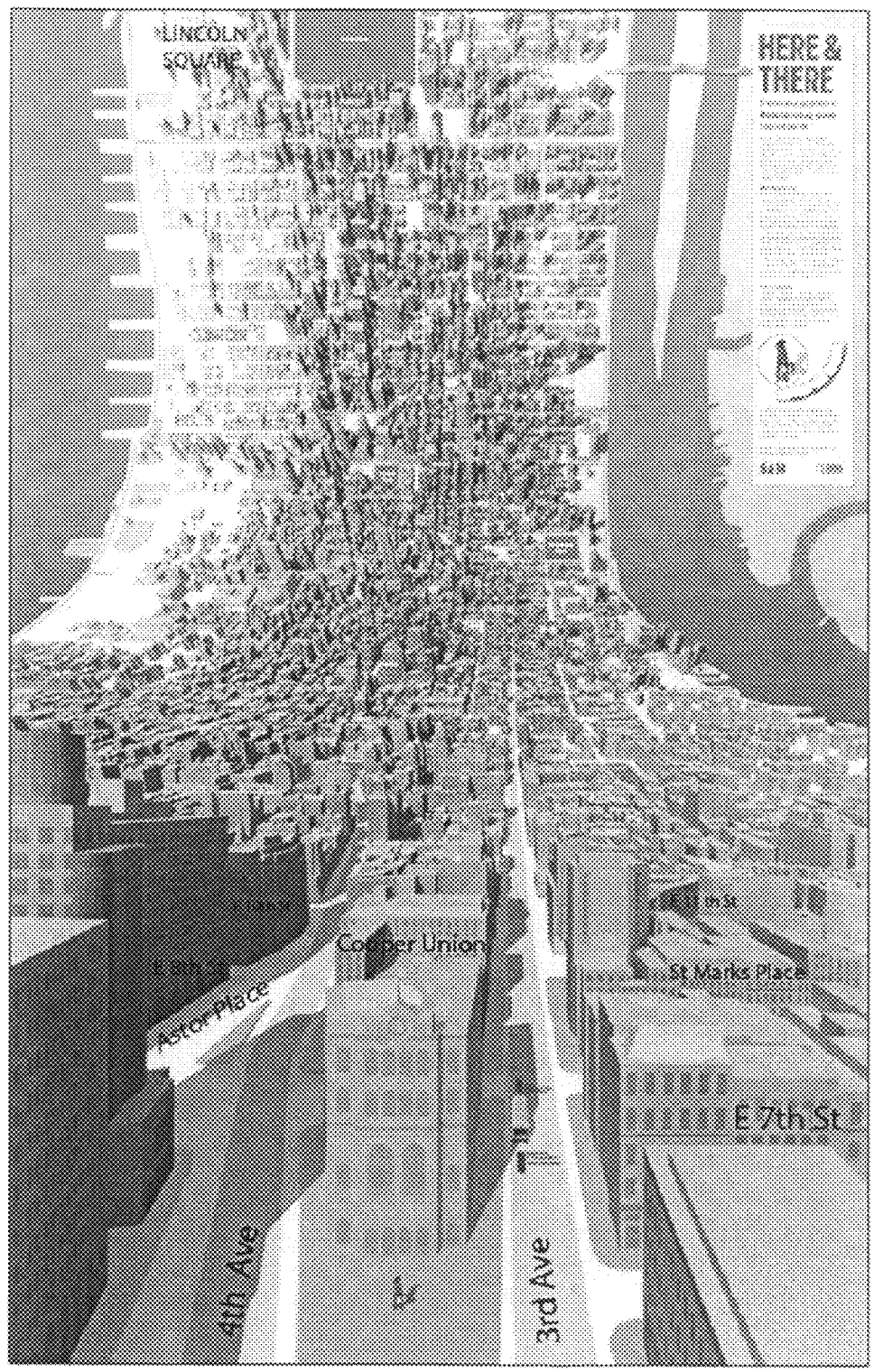
FIG. 1 shows a map of Manhattan observing up town from in front of the Cooper Union building on the corner of $3^{rd}$ Avenue and $7^{th}$ Street.

As can be seen from FIG. 1 an observer signified by an image of a person carrying a travel bag stands in front of the Cooper Union building. From the map, the observer is able to identify $3^{rd}$ and $4^{th}$ Avenues and local land marks St Marks Place and Astor Place which would be identifiable from the observer's real world perspective, thus the observer can orient himself in his immediate surroundings. In the real world, the observer's view of distant land marks would be entirely obscured by the many and closely proximal tall buildings. However, on viewing the map, the observer can locate more distant land marks such as the Empire state building shown in the middle ground on the bend of the map at the middle of the page and even further distant land marks such as Union Square and Central Park marked on the vertical plane of the map at the top of the page. Thus the observer is able to locate himself more generally within the Manhattan district and can plan a route across the district visiting various landmarks of interest in a time efficient and logical order.

Figure 2:
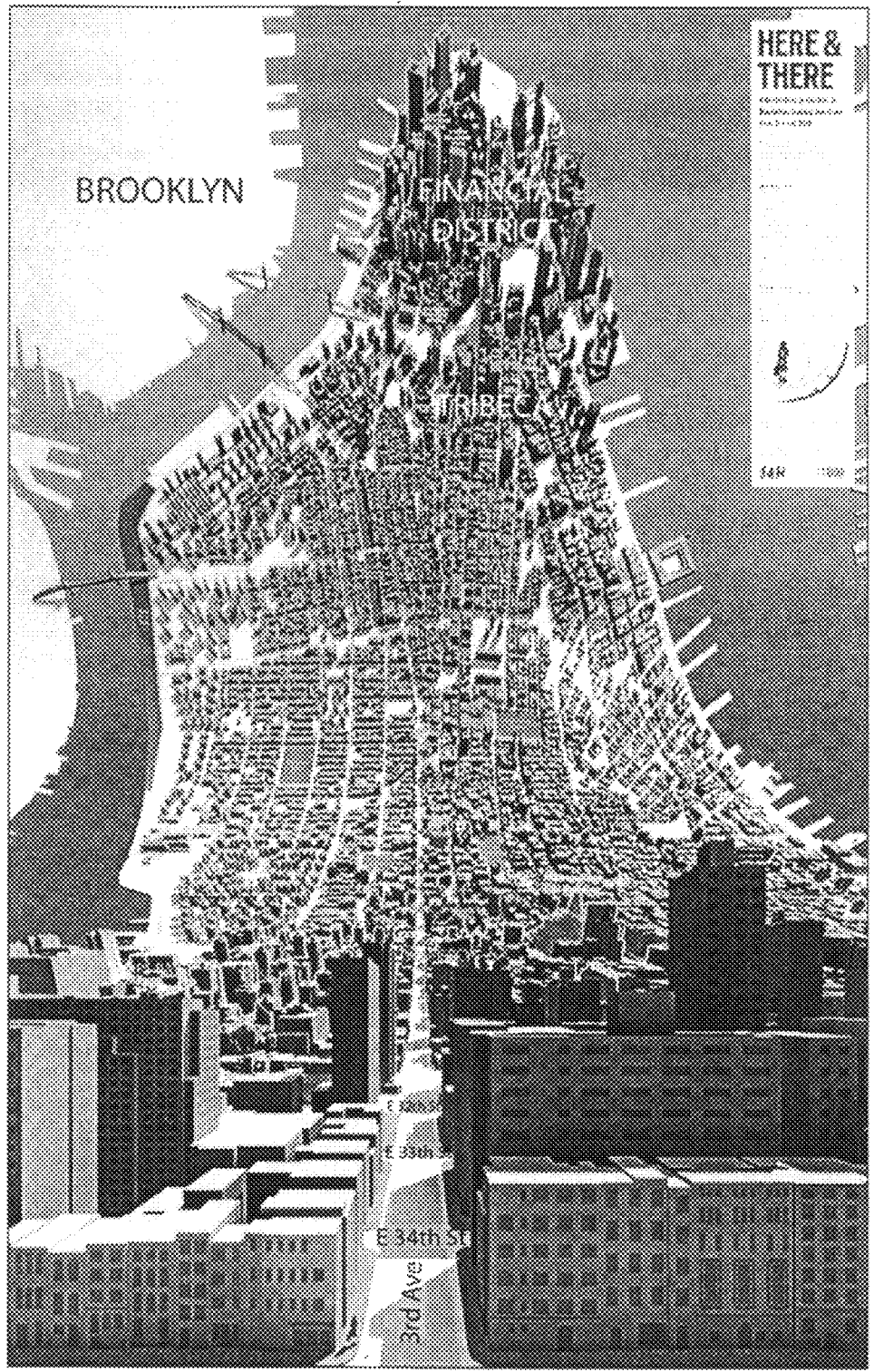
FIG. 2 shows a map of Manhattan observing down town from the corner $3^{rd}$ Avenue and $35^{th}$ Street.

As shown in FIG. 2, the observer is able to locate his immediate position along $3^{rd}$ Avenue and also recognise the Brooklyn bridge and the financial district in the far distance.

Figure 3:
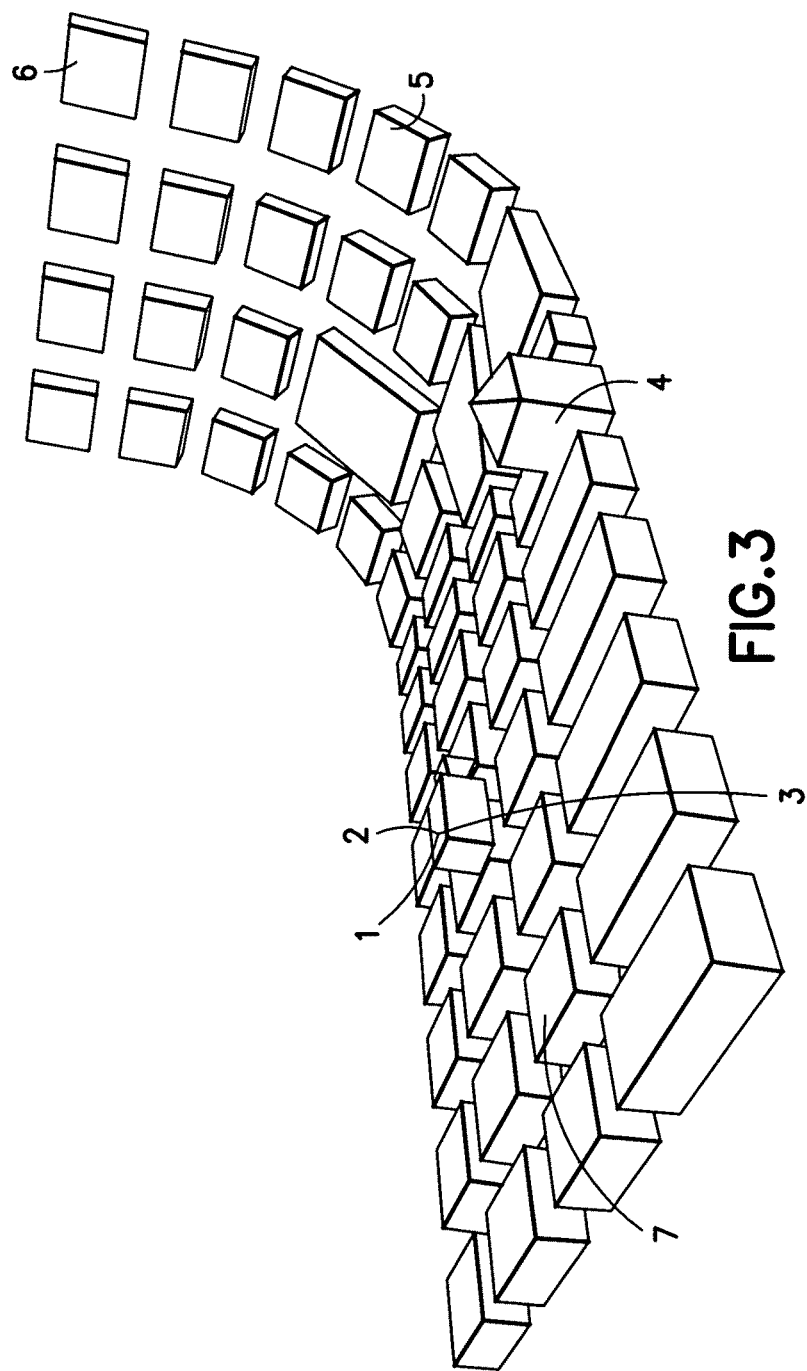
FIG. 3 shows in schematic how the novel map projection of the invention might be integrated into a satellite navigation system.

FIG. 3 shows:
1. A virtual camera
2. The virtual camera is located inside a 3-D model which corresponds to the current geographical location of a satellite navigation device which is determined by, for example, GPS.
3. The orientation of the camera is determined by any of:
   Digital compass
   Direction according to pre determined route
   The last recorded direction of movement
   User choice
   Illustration of route
4. As the virtual terrain recedes into the distance the street (ground) plane shifts slowly from the X (horizontal) plane to the Y (vertical) plane. The angle of the bend changes until buildings in the distance appear in plan relative to the virtual camera. Distortions in the model can be changed depending upon the context of the use, for example walking or driving.
5. Objects on the terrain in the far geographic distance are bent so that their top surfaces face the virtual camera, presenting the objects to the camera in plan view. Objects, landmarks, and route retain their semantic meaning so they can be identified by the user.

Figure 4:
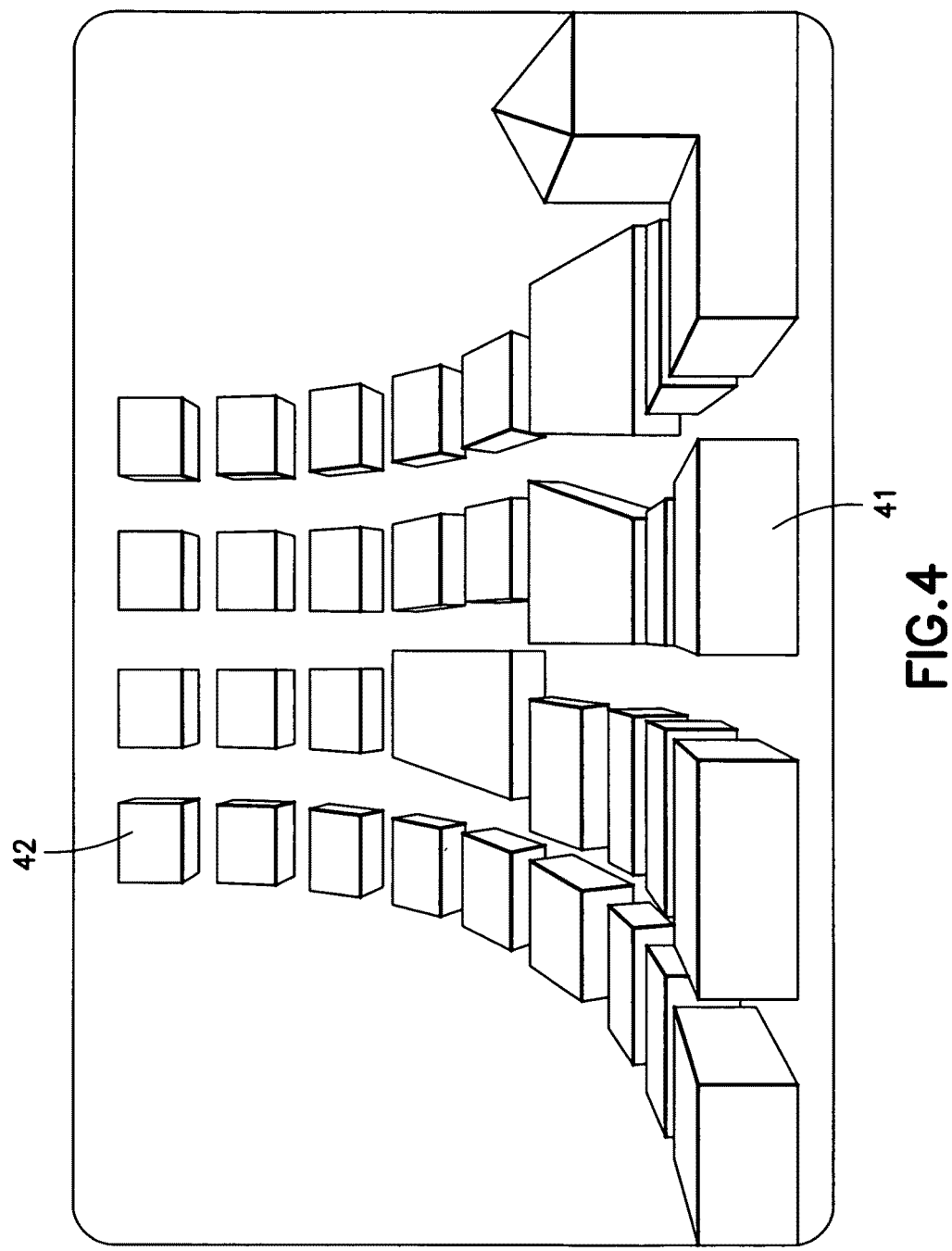
FIG. 4 illustrates how a satellite navigation system display based on the schematic of FIG. 3 might appear to an observer.

FIG. 4 shows the view which would be seen by the virtual camera of FIG. 3. As can be seen the display looks directly ahead. Terrain and buildings in the foreground 41 appear virtually as they do in the real world environment. Terrain in the distance 42 distorts to appear almost as if in plan.

The novel map projection works by presenting an image of the place in which the observer is standing. As the city recedes into the (geographic) distance it shifts from a natural, third person representation of the observer's immediate surroundings into a near plan view. The city appears folded up, as though a large crease runs through it. The distance is potentially infinite, showing both the observer's surroundings and also the city in the distance in a small display space.

The projection begins as a three-dimensional representation of the immediate environment in which the observer stands. Close buildings are represented normally and the observer is shown where he stands, in the third person. The projection bends from a first plane (typically but not essentially a horizontal plane) to a second plane (typically but not essentially a vertical plane) orthogonal to the first plane, the more distant objects are revealed on the second plane in plan view. The projection thus connects the observer's local environment seamlessly to more remote destinations which otherwise are not visible from the observer's stand point.

The invention claimed is:

1. A map display system for presenting a three-dimensional map on a display, the map display system being operative to:
   present a map, defining a geographic area, on a display as a curved surface which comprises a first plane, a second plane and a non-linear portion which is intermediate the first and second planes, wherein a direction normal to the first plane is substantially orthogonal to a direction normal to the second plane; and
   present a reference icon, identifying an observation point in the geographic area represented by the map, in the first plane of the curved surface of the map;
   wherein:
   the height of land marks and buildings in a defined foreground relative to the reference icon are presented normal to the first plane of the curved surface of the map,
   the height of land marks and buildings at a defined far distance relative to the reference icon are presented normal to the second plane of the curved surface of the map,
   the height of land marks and buildings in a defined middle ground relative to the reference icon are presented normal to the non-linear portion of the curved surface of the map, and
   the geographic area represented by the map can be translated along the curved surface of the map to provide a perception that the reference icon is roaming through the displayed geographic area.

2. The map display system as claimed in claim 1, wherein the geographic area represented by the map can be rotated with the reference icon as the centre of rotation, thus producing an impression of an observer turning to face a different direction in the displayed geographic area.

3. A navigation system incorporating the map display system as claimed in claim 1, wherein the reference icon represents an object being navigated.

4. The navigation system as claimed in claim 3, wherein the navigation system further incorporates GPS and the reference icon represents the GPS-located position.

5. The navigation system as claimed in claim 3, wherein the speed of translation of the geographic area represented by the map is variable and dependent on the speed of travel of the object in that geographic area.

6. The navigation system as claimed in claim 3, wherein the curvature of the curved surface of the map is variable and dependent on the speed of travel of the object in the geographic area represented by the map.

7. The map display system as claimed in claim 1, wherein the first plane is presented as a horizontal plane and the second plane is presented as a vertical plane.

* * * * *